(12) United States Patent
Ross et al.

(10) Patent No.: US 8,275,685 B2
(45) Date of Patent: Sep. 25, 2012

(54) DETERMINING A PAYMENT STRATEGY

(75) Inventors: Erik Stephen Ross, Charlotte, NC (US); Hans Dirk Schumacher, Matthews, NC (US); David Neil Joffe, Charlotte, NC (US); Susan Smith Thomas, Gastonia, NC (US)

(73) Assignee: Bank of America Corporation, Charlotte, NC (US)

( * ) Notice: Subject to any disclaimer, the term of this patent is extended or adjusted under 35 U.S.C. 154(b) by 334 days.

(21) Appl. No.: 12/651,580

(22) Filed: Jan. 4, 2010

(65) Prior Publication Data

US 2011/0166994 A1    Jul. 7, 2011

(51) Int. Cl.
*G06Q 40/00* (2006.01)
(52) U.S. Cl. ........................................... 705/35
(58) Field of Classification Search .............. 705/35
See application file for complete search history.

(56) References Cited

U.S. PATENT DOCUMENTS

| | | | | |
|---|---|---|---|---|
| 5,557,515 | A * | 9/1996 | Abbruzzese et al. | 705/7.15 |
| 7,766,244 | B1 * | 8/2010 | Field et al. | 235/493 |
| 2009/0089193 | A1 * | 4/2009 | Paintin | 705/34 |

FOREIGN PATENT DOCUMENTS

WO    WO 2008/150243 A2    12/2008

OTHER PUBLICATIONS

Lewis, Paul; "A Christmas card to give you credit"; Community Care, Oct. 29, 2009; ISSN: 0307-5508; Journal Code: CMNC.*
What Investment; "Know your limit: the rules surrounding ISAs are in a state of flux. What investment looks at the allowances available until Apr. 2005—and beyond."; Jan. 2005; ISSN: 0263-953X.*
Singletary, Michelle; "Living Well with the Money you have"; Black Enterprise; Mar. 2004; ISSN: 0006-4165; Journal Code: BEN.*

* cited by examiner

*Primary Examiner* — Lalita M Hamilton
*Assistant Examiner* — Edward Chang
(74) *Attorney, Agent, or Firm* — Michael A. Springs; Moore & Van Allen PLLC; Andrew D. Gerschutz

(57) ABSTRACT

Embodiments of the present invention relate to methods and apparatuses for determining, recommending, and/or executing a payment strategy. For example, in some embodiments, a method is provided for determining a payment strategy for using at least some funds from a first account to make two or more payments on a second account during a single pay period. In such embodiments, the method includes: (1) determining that the second account includes a payment due date and a minimum payment due; (2) determining a number of payments to make on the second account; (3) determining a payment amount for each payment, such that the total payment amount for all of the payments is sufficient to at least offset the minimum payment due; and (4) determining a triggering event for each payment, such that each of the payments is made on or before the payment due date.

25 Claims, 5 Drawing Sheets

DETERMINING A PAYMENT STRATEGY

FIELD

In general terms, embodiments of the present invention relate to methods and apparatuses for determining, recommending, and/or executing a payment strategy.

BACKGROUND

Financial institution customers are constantly looking for new and useful ways to mitigate or eliminate the hassles associated with managing their finances, particularly those associated with making (and remembering to make) account payments. This is particularly so given that most of today's financial institution customers have multiple financial accounts and it can be difficult to keep track of the payment amounts and dates with multiple accounts. Accordingly, there is a need to provide methods and apparatuses that help financial institution customers better manage their finances, and in particular, help customers make (and remember to make) account payments.

SUMMARY OF SELECTED EMBODIMENTS OF THE PRESENT INVENTION

In general terms, embodiments of the present invention relate to methods and apparatuses for determining, recommending, and/or executing a payment strategy. For example, in some embodiments, a method is provided for determining a payment strategy for using at least some funds from a first account to make two or more payments on a second account during a single pay period. In some embodiments, the method includes: (1) determining that the second account includes a payment due date and a minimum payment due; (2) determining a number of payments to make on the second account; (3) determining a payment amount for each payment, such that the total payment amount for all of the payments is sufficient to at least offset the minimum payment due; and (4) determining a triggering event for each payment, such that each of the payments is made on or before the payment due date.

In some embodiments, the method further includes: (1) receiving information associated with a transaction history of the first account or information associated with a transaction history of the second account; and (2) determining a trend based at least partially on the transaction history of the first account or the transaction history of the second account. In some embodiments, at least one of determining the number of payments, determining the payment amount for each payment, or determining the triggering event for each payment is based at least partially on the trend.

In some embodiments of the method, at least one of determining the number of payments, determining the payment amount for each payment, or determining the triggering event for each payment is based at least partially on a user selection. In other embodiments of the method, at least one of determining the number of payments, determining the payment amount for each payment, or determining the triggering amount for each payment is based at least partially on a user-predicted future behavior.

In some embodiments, the method includes communicating a payment strategy recommendation to a user, where the payment strategy recommendation includes information associated with at least one of the number of payments, the payment amount for each payment, or the triggering event for each payment. In some embodiments, the payment strategy recommendation includes functionality configured to enable the user to accept, modify, or reject the payment strategy recommendation.

In some embodiments, the method includes recommending to a user the first account and the second account for involvement in the payment strategy. In other embodiments, the method includes prompting a user to select the first account and the second account for involvement in the payment strategy. In some embodiments, the method includes: (1) linking the first account to the second account; and (2) executing the payment strategy based at least partially on the number of payments, the payment amount for each payment, and the triggering event for each payment. In some embodiments, the method further includes attributing rewards to the first account or the second account based at least partially on executing the payment strategy.

In some embodiments of the method, determining the number of payments further includes determiningeN payments, and determining the payment amount for each payment further includes determining a payment amount for each payment that is equal to the minimum payment due divided by N. In some embodiments of the method, determining the triggering event for each payment further includes scheduling a predetermined time to make each payment. In some embodiments, the first account includes two or more accounts. In some embodiments, the first account includes a deposit account and the second account includes a credit account. In some embodiments, the first account is maintained by a first financial institution and the second account is maintained by a second financial institution.

As another example, in some embodiments, a system is provided for using at least some funds from a first account to make two or more payments on a second account during a single pay period. In some embodiments, the system includes a processor, where the processor is configured to: (1) determine that the second account includes a payment due date and a minimum payment due; (2) determine a number of payments to make on the second account; (3) determine a payment amount for each payment, such that the total payment amount for all of the payments is sufficient to at least offset the minimum payment due; and (4) determine a triggering event for each payment, such that each of the payments is made on or before the payment due date.

As still another example, in some embodiments, a computer program product is provided for using at least some funds from a first account to make two or more payments on a second account during a single pay period. In some embodiments, the computer program product includes a computer-readable medium having computer-executable computer program code portions stored therein. In some embodiments, the computer-executable program code portions include: (1) a first program code portion configured to determine that the second account includes a payment due date and a minimum payment due; (2) a second program code portion configured to determine a number of payments to make on the second account; (3) a third program code portion configured to determine a payment amount for each payment, such that the total payment amount for all of the payments is sufficient to at least offset the minimum payment due; and (4) a fourth program code portion configured to determine a triggering event for each payment, such that each of the payments is made on or before the payment due date.

BRIEF DESCRIPTION OF THE DRAWINGS

Figure 1:
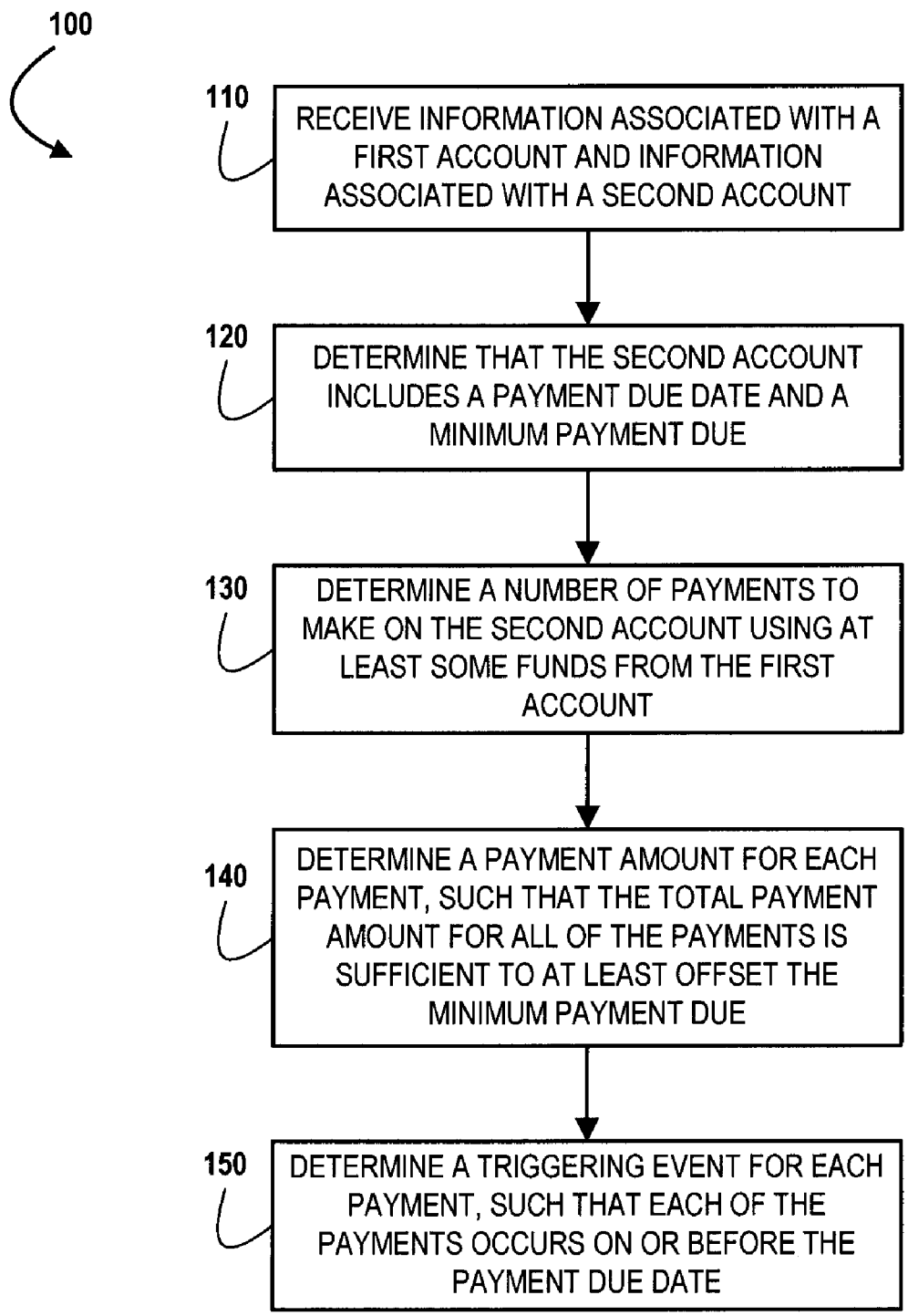
Figure 2:
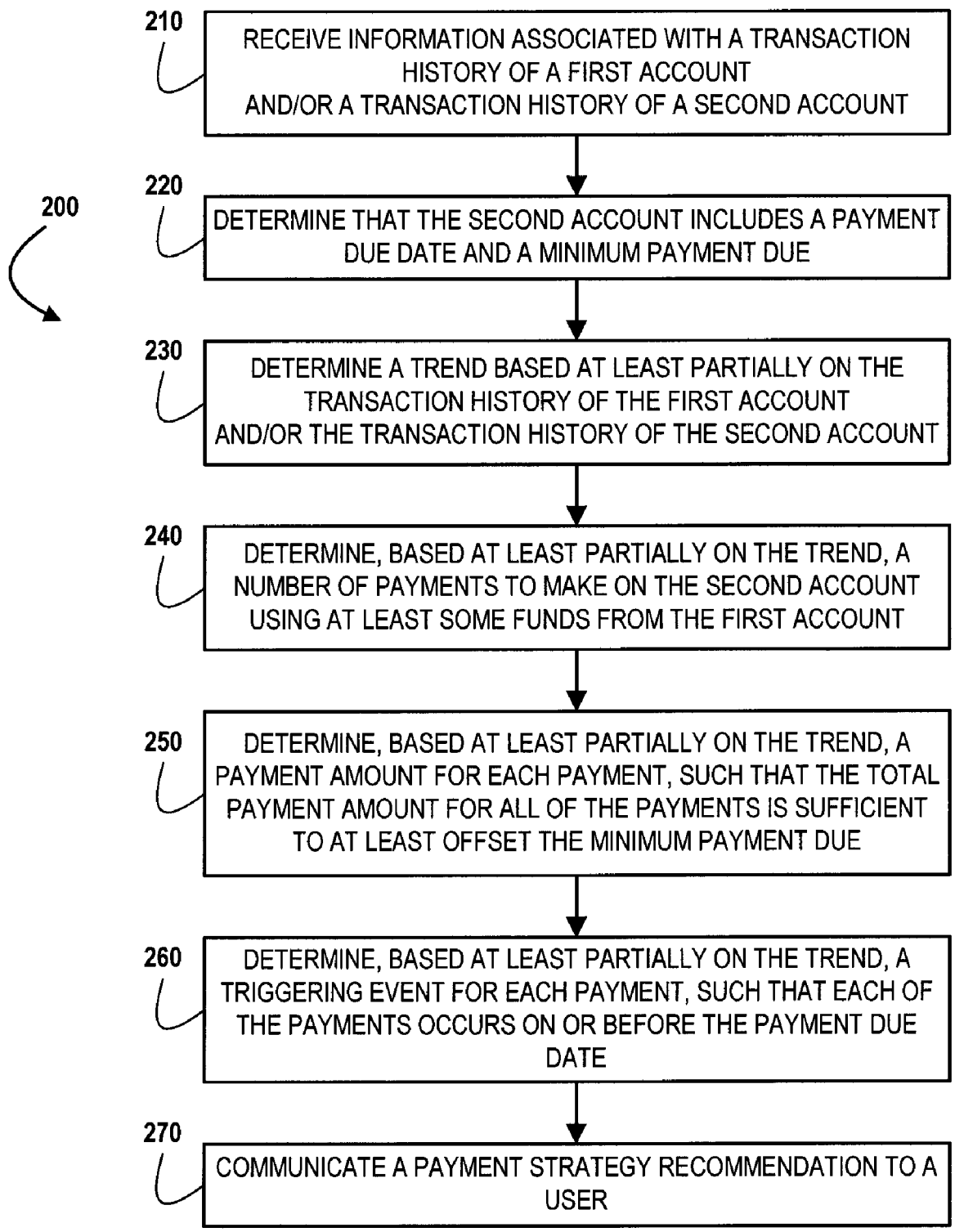
Figure 3:
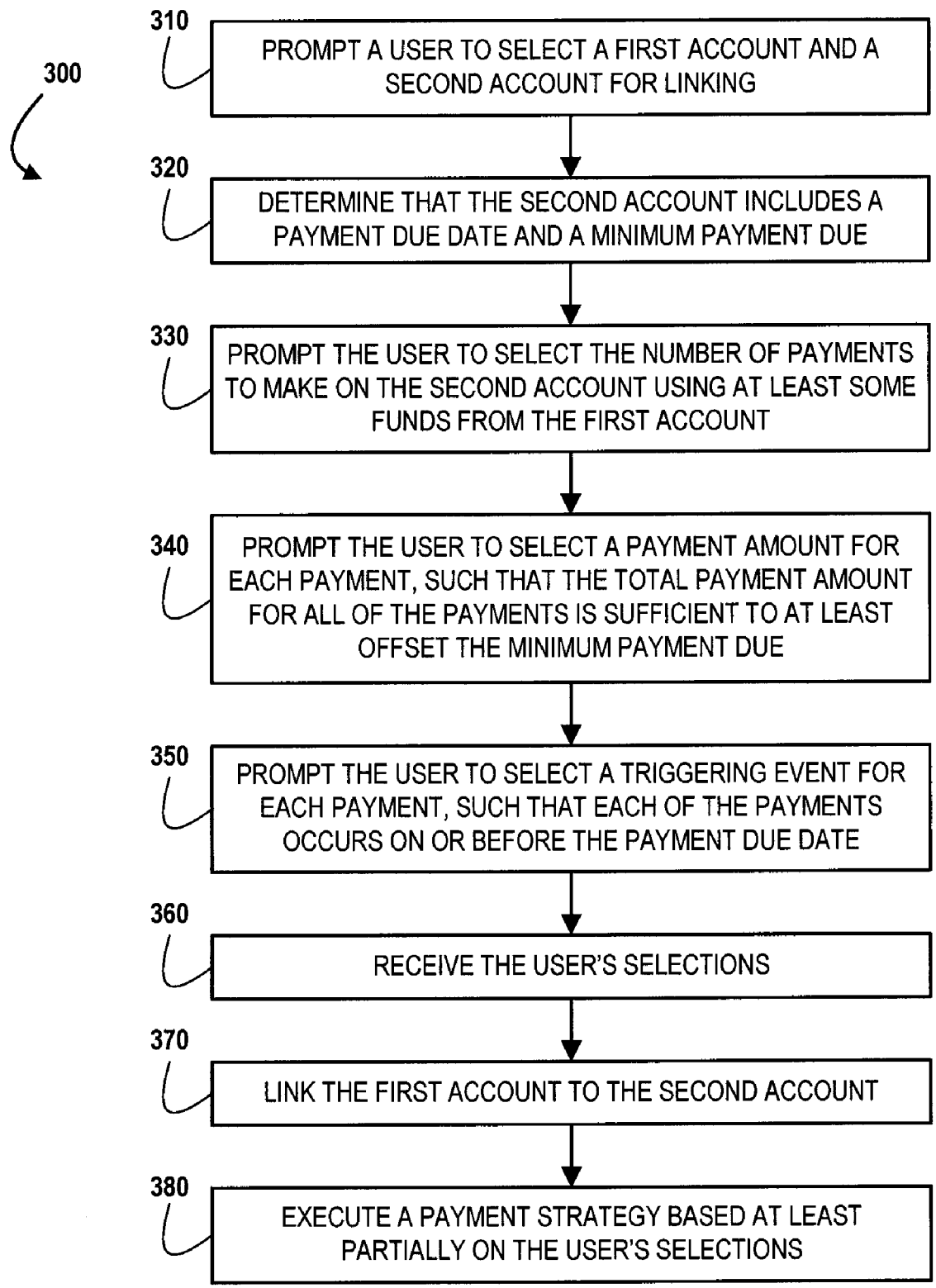
Figure 4:
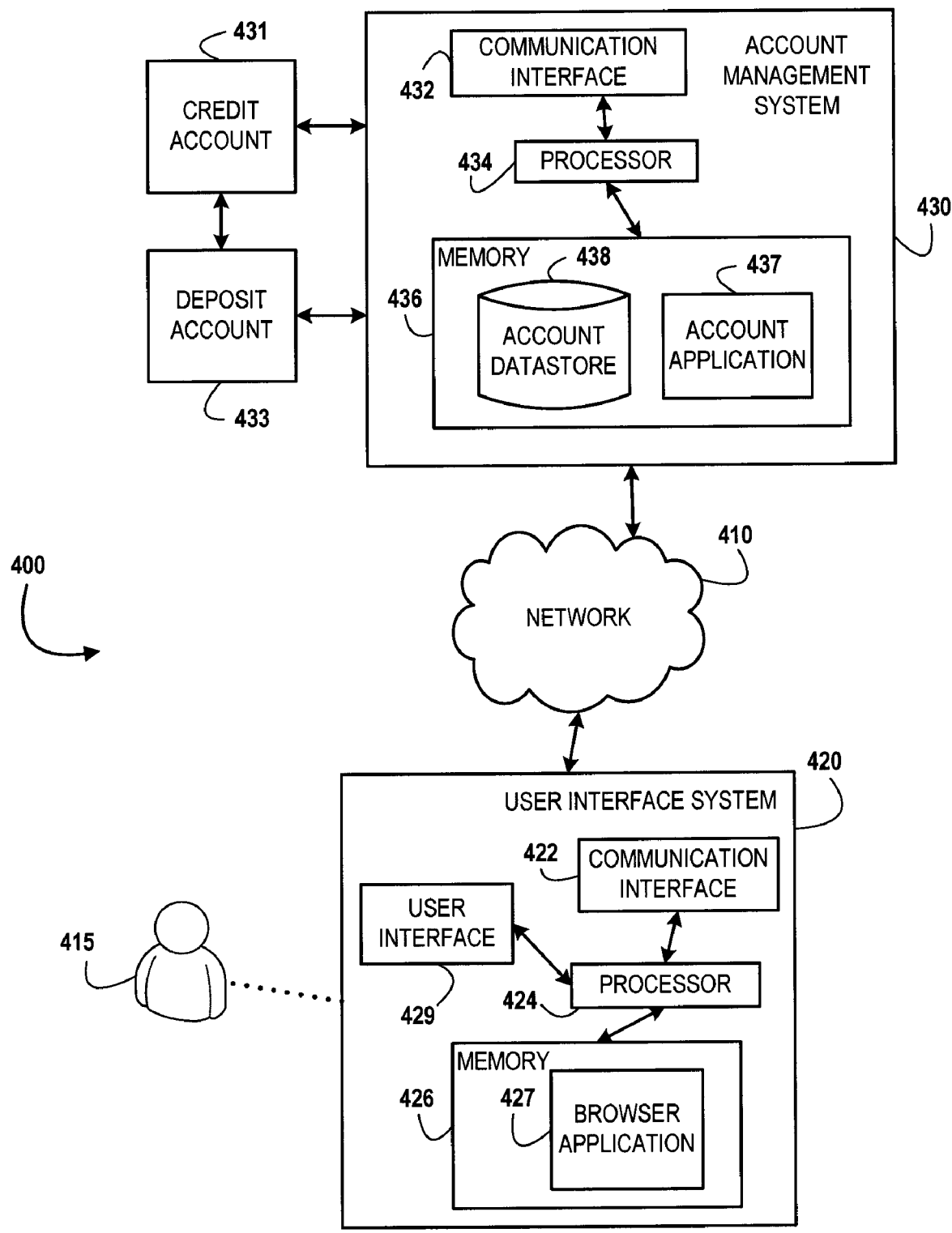
Figure 5:
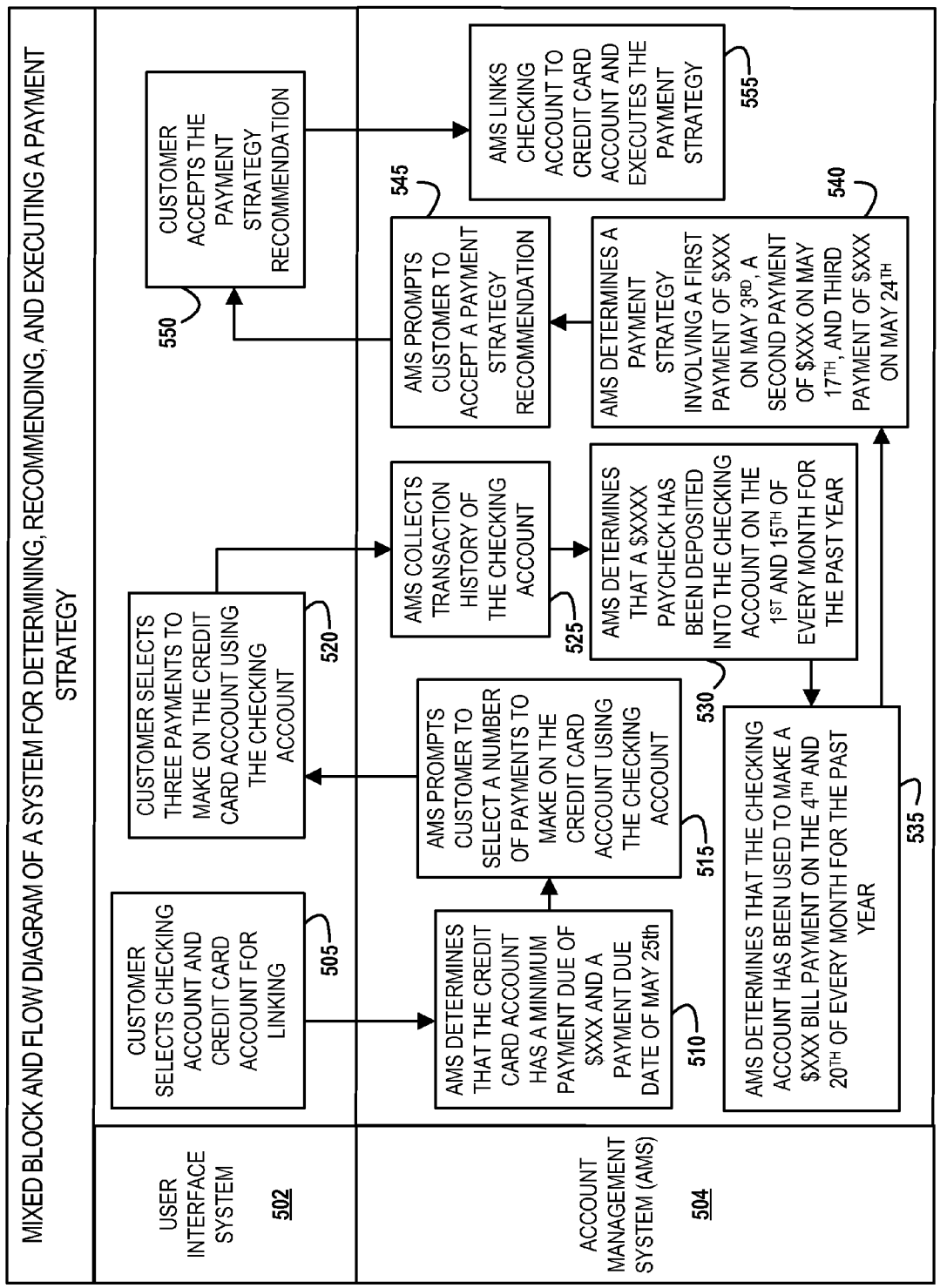

Having thus described embodiments of the present invention in general terms, reference will now be made to the accompanying drawings, wherein:

FIG. 1 is a flow diagram illustrating a general process flow of a system for determining a payment strategy, in accordance with an embodiment of the present invention;

FIG. 2 is a flow diagram illustrating a general process flow of a system for determining and recommending a payment strategy based at least partially on a trend, in accordance with an embodiment of the present invention;

FIG. 3 is a flow diagram illustrating a general process flow of a system for determining and executing a payment strategy based at least partially on one or more user selections, in accordance with an embodiment of the present invention;

FIG. 4 is a block diagram illustrating technical components of a system for determining, recommending, and/or executing a payment strategy, in accordance with an embodiment of the present invention; and FIG. 5 is a mixed block and flow diagram illustrating a system for determining, recommending, and executing a payment strategy, in accordance with an embodiment of the present invention.

DETAILED DESCRIPTION OF EMBODIMENTS OF THE PRESENT INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and/or vice versa, unless explicitly stated otherwise. Also, as used herein, the term "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, an electronic, magnetic, optical, electromagnetic, infrared, and/or semiconductor system, apparatus, and/or device. For example, in some embodiments, the computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a computer-readable medium (e.g., a memory) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

Further, although many of the embodiments of the present invention described herein are generally described as involving a "financial institution," other embodiments of the present invention may involve one or more persons, organizations, businesses, and/or other entities that take the place of, or work in conjunction with, the financial institution to implement one or more of the embodiments described herein as being performed by the financial institution.

In general terms, embodiments of the present invention relate to methods and apparatuses for determining, recommending, and/or executing a payment strategy. For example, some embodiments are configured to determine, recommend, and/or execute a payment strategy for using at least some funds from a first account (e.g., a deposit account) to make two or more payments on a second account (e.g., a credit account) during a single pay period. More specifically, some embodiments of the present invention are configured to determine the one or more parameters of the payment strategy, such as, for example, the number of payments to make on the second account, the payment amount for each payment, the triggering event for each payment, etc. Other embodiments of the present invention are configured to enable an account holder (and/or other user) to determine, configure, input, define, accept, modify, and/or otherwise select (collectively referred to herein as "select" for simplicity) the one or more parameters of the payment strategy. In some embodiments, the payment strategy is additionally or alternatively based at least partially on one or more rules for governing the payment strategy. In other embodiments, the payment strategy is based at least partially on a transaction history of the first account and/or a transaction history of the second account. For example, some embodiments of the present invention are configured to determine one or more trends from a transaction history (e.g., dates and/or amounts of paychecks, dates and/or amounts of bill payments, average daily balances, etc.) and then determine a payment strategy that accommodates those one or more trends.

As such, embodiments of the present invention may provide several benefits, including, for example: (1) enabling the account holder to personalize, individualize, customize, and/or otherwise optimize a payment strategy for using at least some funds from the first account to make two or more payments on the second account during a single pay period, thereby empowering the account holder with more control over his or her finances; (2) enabling the account holder to make several, smaller payments on the second account per pay period, which research indicates is a more manageable perception than making one, larger payment per pay period; (3) enabling the account holder to make account payments in accordance with trends determined from the transaction history of the first account and/or the second account, thereby "smoothing out" payments and eliminating or reducing the impact of any one payment on the rest of the account holder's finances; and (4) enabling the account holder to mitigate or eliminate the hassles associated with making (and/or remembering to make) periodic (e.g., monthly) account payments.

As another example of a benefit, some embodiments of the present invention are particularly useful for managing account payments on accounts that have incurred long-term and/or relatively large liabilities. For example, in some cases, an account holder may carry a balance on a home equity line of credit, thereby exposing the account holder to costs to carry the balance. In many cases, the cost to carry a balance is based at least partially on the average daily balance for the account. In response to such cases, some embodiments of the present invention are configured to determine a payment strategy (and/or facilitate the account holder or other user to determine a payment strategy) that is specifically directed to reducing the average daily balance of the account. For example, in some embodiments, a system is configured to determine a payment strategy for using at least some funds from a checking account to make two or more payments on the account during a single pay period, such that the total amount for all of the payments is sufficient to at least offset the minimum payment due on the account, and such that each of the payments occurs during the same pay period on or before the payment due date for the account.

By adopting this payment strategy, the account holder can reduce the cost to carry a balance he or she pays on the account over the life of the account balance, as compared to adopting a payment strategy of making a single payment equal to the minimum payment due on the payment due date for each pay period over the life of the account balance. It will also be understood that this payment strategy enables the account holder to pay off the account balance faster than if the holder adopts the payment strategy of, for each pay period, only paying the minimum payment due on the payment due date.

Referring now to FIG. 1, a general process flow 100 of a system for determining a payment strategy for is provided, in accordance with an embodiment of the present invention. As represented by the block 110, the system is configured to receive information associated with a first account and information associated with a second account. As represented by the block 120, the system is also configured to determine that the second account includes a payment due date and a minimum payment due. As represented by the block 130, the system is configured to determine a number of payments to make on the second account using at least some funds from the first account. As represented by the block 140, the system is configured to determine a payment amount for each payment, such that the total payment amount for all of the payments is sufficient to at least offset the minimum payment due. As represented by the block 150, the system is configured to determine a triggering event for each payment, such that each of the payments occurs on or before the payment due date.

It will be understood that the first account and the second account may be and/or include any type of account. For most embodiments, the first account is a deposit account (e.g., checking account, savings account, money market account, certificate of deposit account, investment account, etc.), and the second account is a revolving credit account (e.g., a credit card account, a line of credit (LOC) account, a home equity line of credit (HELOC) account, etc.). However, it will be understood that, in some embodiments, the second account is an installment credit account, such as, for example, a student loan account, a home equity loan account, a car loan account, a mortgage account, and/or the like. Alternatively, in some embodiments, the second account is a non-traditional financial account, such as, for example, a grocery store account (e.g., for purchasing groceries with store-extended credit, for receiving and/or paying grocery store invoices, etc.), an online account with a cable company (e.g., for receiving and paying cable bills), and/or the like. It will also be understood that, in some embodiments, the first account and the second account are both credit accounts, such as, for example, where both the first account and the second account are credit card accounts, where the first account is a HELOC account and the second account is a credit card account, and/or the like.

It will also be understood that, in some embodiments, the first account, the second account, and/or the system having the process flow 100 are owned, controlled, serviced, managed, operated, and/or maintained (collectively referred to herein as "maintained" for simplicity) by a single financial institution. For example, in some embodiments, the system is maintained by a bank, the first account is maintained by the bank and held by a bank customer, and the second account is maintained by the bank and held by the bank customer. Of course, in accordance with some embodiments, the first account and the second account need not be maintained by the same financial institution (or any financial institution). For example, in some embodiments, the system having the process flow 100 is configured to determine a payment strategy involving a checking account maintained by Financial Institution A and a credit card account maintained by Financial Institution B.

Also, it will be understood that, although much of the description herein refers to accounts held by individuals, the first account and/or the second account may be held by one or more families, households, social networks, businesses (e.g., corporations, business units within corporations, small businesses, for profit, non-profit, etc.), and/or other entities. For example, in some embodiments, the system having the process flow 100 is configured to determine a payment strategy that involves a family checking account (e.g., the first account) and a family credit card account (e.g., the second account), where each account is jointly held by husband and wife. As another example, in some embodiments, the system is configured to determine a payment strategy that involves a small business checking account and a small business LOC account. Of course, it will be understood that some embodiments of the present invention may involve at least two different types of entities, such as, for example, where the first account is an individual's checking account and the second account is a family credit card account.

Additionally, it will be understood that, in some embodiments, the "first account" and/or the "second account" includes two or more accounts. In other words, in some embodiments, the system having the process flow 100 is configured to determine a payment strategy that involves more than two accounts. For example, in some embodiments, the system is configured to determine a payment strategy that involves a checking account, a savings account, and a credit card account, such that at least some funds from the checking account and at least some funds from the savings account are used to make two or more payments on the credit card account. As another example, in some embodiments, the system having the process flow 100 is configured to determine a payment strategy that involves a savings account, a credit card account, a mortgage account, and a student loan account, such that funds from the savings account are used to make two or more payments on the credit card account, two or more payments on the mortgage account, and two or more payments on the student loan account.

Also regarding the step represented by the block 110, it will also be understood that the information associated with the first account and the information associated with the second account may include any amount and/or type of information. In some embodiments, the information includes some or all of the same information that is typically found in a periodic (e.g., monthly) account statement. For example, depending on the type of account, the information may include the type of the account, the account name, the account number, the name of the account holder, the account balance, the minimum payment due, the payment due date, the transaction history for the account, the credit line amount, the credit available amount the costs to carry a balance, the amount of any interest rate associated with the account, the original principal balance, the total interest and/or principal paid amount, the total current balance, the payment received amount, and/or the like.

It will also be understood that the system having the process flow 100 may be configured to receive information associated with the first and/or second accounts in any way and/or in any form. For example, in some embodiments, the system is embodied as an account management system configured to manage the first and/or second accounts by, for example, opening the accounts for the account holder, providing online and/or mobile services associated with the accounts (e.g., online and/or mobile banking, etc.), processing and/or posting transactions involving the accounts, calculating the account balance for the accounts, calculating the minimum payment due for the accounts, setting the payment due date for the accounts, communicating account statements to the account holder, receiving a deposit into the accounts from the account holder, receiving a payment on the accounts from the account holder, and/or the like. Thus, in such embodiments, the account management system is configured to receive information associated with the first and/or second account in the normal course of managing those accounts.

As another example, in some embodiments, the system having the process flow 100 is separate from an account management system but is configured to receive information associated with the first and/or second accounts from an account management system and/or from some other system maintained by a financial institution. As another example, in some embodiments, the system having the process flow 100 is configured to receive account information directly from the account holder (e.g., via an online and/or mobile banking account, online form, e-mail, telephone call, etc.). As still another example, in some embodiments, the system is configured to collect information associated with the first and/or second account by, for example, accessing an online and/or mobile banking account that includes the first and/or the second account. Similarly, in some embodiments, the system having the process flow 100 is configured to collect account information by reading that information directly from an account statement associated with the first and/or second account. In some embodiments, the system having the process flow 100 is configured to collect and/or otherwise receive information associated with first account and/or information associated with the second account in real time, near real time, and/or at one or more predetermined times.

Further, as used herein, the phrases "minimum payment due" and "payment due date" referred to in the block 120 are typically related, such that one can be defined in terms the other. Thus, in general terms, a minimum payment due refers to the amount an account holder must pay on the account before a payment due date. Likewise, in general terms, a payment due date refers to the date on which an account holder must make at least a minimum payment due on the account. It will be understood that the minimum payment due and/or the payment due date are typically determined by the financial institution maintaining the second account. In some embodiments, the system having the process flow 100 is configured to determine the minimum payment due and/or the payment due date based at least partially on one or more terms of an account agreement (e.g., cardholder agreement, promissory note, etc.), and, in some cases, the minimum payment due and/or the payment due date may be contractually binding on the holder of the second account. It will also be understood that the minimum payment due and/or the payment due date are typically provided to an account holder in a periodic (e.g., monthly) account statement.

It will be further understood that, in some embodiments, the minimum payment due and/or the payment due date are selected by a user (e.g., the first and/or second account holder, a financial institution employee, etc.). Also, in some embodiments, the second account may have more than one minimum payment due and/or payment due date. For example, in some embodiments, a minimum payment due may be a first amount if the payment is made on or before the first payment due date, whereas the minimum payment due may be a second amount if the payment is made after the first payment due date but before a second payment due date.

It will also be understood that, in some embodiments, the minimum payment due is based at least partially on the account balance and/or on one or more individual transactions in which the account was involved. For example, in some embodiments where the second account includes a student loan account, the minimum payment due refers to the minimum interest and principal payment regularly due (e.g., monthly) on the student loan account. As another example, in some embodiments where the second account includes a credit card account, the minimum payment due equals either 3% of the current account balance or $15, whichever amount is greater. Also, it will be understood that, in some embodiments, the minimum payment due is the same amount from pay period to pay period, but that in other embodiments, the minimum payment due may be different from pay period to pay period. In some embodiments, the same is true of the payment due date.

It will also be understood that the minimum payment due and the payment due date may be determined in any way. For example, in some embodiments, as mentioned above, the system having the process flow 100 is an account management system configured to calculate, set, and/or otherwise determine a payment due date and a minimum payment due in the regular course of its operations. In other embodiments, however, the system having the process flow 100 is configured to receive this information from another system (e.g., an account management system) and/or from some other entity (e.g., the account holder, the financial institution maintaining the second account, etc.). In some embodiments, the system is configured to read and/or otherwise access account information (e.g., via an online and/or mobile banking account) for the purpose of determining a payment due date and a minimum payment due. As another example, in some embodiments, the system is configured to determine the minimum payment due and/or the payment due date based at least partially on one or more user selections.

Also, it will be understood that the "number of payments" referred to in the block 130 means "two or more payments." Thus, the system having the process flow 100 is configured to determine a payment strategy that involves making at least two individual payments on the second account on or before the payment due date. It will also be understood that the two or more payments involved in the payment strategy are made during the same pay period, which typically refers to the period of time between two consecutive payment due dates. However, in some embodiments, the pay period begins when an account statement is created, published, and/or transmitted to the account holder and ends on the next payment due date. In many cases, a pay period refers to a period of approximately or exactly one month.

Additionally, it will be understood that the system is configured to determine a number of payments to make on the second account using "at least some" funds from the first account. The inclusion of the phrase "at least some" emphasizes that the first account may not be the sole provider of funds for the two or more payments on the second account. Indeed, as mentioned previously, in some embodiments, funds from two or more accounts are used to make the two or more payments on the second account. For example, in some embodiments, the system is configured to determine a number of payments to make on a credit card account using at least some funds from a checking account and at least some funds from a savings account. Of course, these funds may be divided up in any way. Using the previous example, the system may determine a payment strategy that uses funds from the checking account to fund, for example, 30% of every payment and funds from the savings account to fund 70% of every payment. In other embodiments, the payment strategy may involve using funds from the checking account to fund the entire first payment and funds from the savings account to fund every payment thereafter.

Regarding the step represented by the block 140, it will be understood that the payment amount for each payment may be any non-zero amount so long as the total payment amount for all of the payments is sufficient to at least offset the minimum payment due. In some embodiments, the system is configured to divide the minimum payment due by the number of payments, such that each payment amount is equal to every other payment amount, and the total payment amount for all of the payments equals the minimum payment amount. However, in other embodiments, the payment amount for every payment is not the same, and/or the total payment amount for all of the payments is greater than the minimum payment due. As a specific example, where the minimum payment due is $125 and the number of payments is three, the system having the process flow 100 may be configured to determine a first payment amount of $100, a second payment amount of $15, and a third payment amount of $45, such that the total payment amount for all of the payments is $160.

Regarding the step represented by the block 150, it will be understood that the phrase "triggering event" refers to an event that automatically triggers the execution, performance, and/or implementation of a triggered action, either immediately, nearly immediately, or sometime after (e.g., within the same day or week or month, at a predetermined time, etc.) the occurrence of the event. For example, in some embodiments, a deposit made into the first account (the triggering event) automatically triggers the system having the process flow 100 to make a payment on the second account (the triggered action). In some cases, the system may be configured to automatically make the payment immediately or nearly immediately after the deposit is made into the first account. However, in other embodiments, instead of immediately or nearly immediately after the deposit is made into the first account, the system is configured to automatically make the payment at some predetermined time after the deposit is made into the first account (e.g., forty-eight hours after the deposit is made, at the end of day on the Friday after the deposit is made, etc.).

It will be understood that a triggering event can be any user-selected, system-determined, and/or otherwise predetermined event. The occurrence of the triggering event may be expected (e.g., making a payment upon or after a regular, bimonthly paycheck is deposited into the first account, etc.) or unexpected (e.g., making a payment upon or after an unexpected deposit (e.g., unexpected gift, inheritance, etc.) is made into the first account, etc.). It will also be understood that, in addition to, or instead of, making a deposit into the first account, any other type and/or amount of inflow into and/or outflow out of the first account and/or the second account may serve as a triggering event. As another example, in some embodiments, the event of the first account and/or the second account incurring a liability serves as a triggering event. As still another example, in some embodiments, the triggering event is based at least partially on an account statement, such that, for example, the system is configured to automatically make a payment upon or after the creation, publication, and/or transmission of an account statement for the first and/or second account.

As another example of a triggering event, in some embodiments, the system is configured to automatically make a payment based at least partially on the user's (e.g., first and/or second account holder's) current and/or previous geographic location as determined by, for example, a mobile device (e.g., mobile phone, pager, personal digital assistant, personal computer, etc.) carried by the user. For example, in some embodiments, the system having the process flow 100 is configured to make a payment upon or after determining that the account holder is at home, at work, near a particular store, within a certain zip code, and/or otherwise positioned relative to one or more predetermined geographic locations.

As still another example, in some embodiments, the triggering event is and/or includes a predetermined time and/or the passage of a predetermined period of time. Examples of temporal triggering events include, but are not limited to, the end of day on a particular day, the beginning of day on the first and fifteenth of every month, 12:00 pm on the payment due date, 3:00 pm every Tuesday, 11:59 pm on the Monday before the end of the month, after every ten day period, two weeks after the previous payment, two days before a student loan payment is scheduled to be paid using funds from the first account, etc. It will be understood that, in some embodiments, triggering events are scheduled as one-time only events (e.g., at 2:57 pm on Dec. 27, 2009, etc.), but that in other embodiments, triggering events are recurring such that they occur periodically (e.g., after every deposit, every other Monday, at the first of every month, etc.). It will also be understood that the system having the process flow 100 can be configured to determine any number of triggering events, as well as any number of payments, such that, in some embodiments, the system is configured to determine a payment strategy that involves making a payment on the second account as often as every day (or even more frequently). It will also be understood that the triggering event described in FIG. 1 may be any event so long as each of the payments is made on or before the payment due date.

It will be understood that, in some embodiments, the system having the process flow 100 is embodied in, configured to provide, and/or is otherwise associated with online and/or mobile banking services. For example, in some embodiments, the system having the process flow 100 is embodied as an online and/or mobile banking tool configured to implement the process flow 100 within the context of an online and/or mobile banking account. As another example, in some embodiments, the system having the process flow 100 is configured to provide online and/or mobile banking services to one or more online and/or mobile banking customers via one or more online and/or mobile banking accounts, in addition to executing the steps of the process flow 100. As still another example, in some embodiments, the system having the process flow 100 is separate from, but in communication with, an online and/or mobile banking account, and one or more portions of the online and/or mobile banking account (e.g., an online banking tool) are configured to configure (and/or facilitate a user of the account to configure) the system having the process flow 100 and/or one or more portions of one or more of the steps of the process flow 100. Of course, it will also be understood that any of the other embodiments described and/or contemplated herein may also be embodied in, configured to provide, and/or otherwise be associated with online and/or mobile banking services.

Referring now to FIGS. 2 and 3, it will be understood that the general process flows 200 and 300, as compared with the general process flow 100, represent more-detailed embodiments of the present invention. However, many of the steps of the general process flows 200 and 300 are similar, if not identical, to at least some of the steps of the general process flow 100. Because of these similarities, it will be understood that much of the description of the general process flow 100 also describes at least some of the steps of the general process flows 200 and 300 and that for simplicity, most of that description will not be repeated herein. It will also be understood that the system having the process flow 100 may additionally or alternatively be configured to implement any combination of any one or more of the steps, and/or portions of steps, from any one or more of the process flows 200, 300, and/or any other process flow described and/or contemplated herein.

Referring now specifically to FIG. 2, a general process flow 200 of a system for determining and recommending a payment strategy based at least partially on a trend is provided, in accordance with an embodiment of the present invention. As represented by the block 210, the system is configured to receive information associated with a transaction history of a first account and/or information associated with a transaction history of a second account (sometimes referred to herein as "transaction history(ies)" for simplicity). As represented by the block 220, the system is configured to determine that the second account includes a payment due date and a minimum payment due. As represented by the block 230, the system is also configured to determine a trend based at least partially on the transaction history of the first account and/or the transaction history of the second account. As represented by the block 240, the system is further configured to determine, based at least partially on the trend, a number of payments to make on the second account using at least some funds from the first account. As represented by the block 250, the system is also configured to determine, based at least partially on the trend, a payment amount for each payment, such that the total payment amount for all of the payments is sufficient to at least offset the minimum payment due. As represented by the block 260, the system is configured to determine, based at least partially on the trend, a triggering event for each payment, such that each of the payments occurs on or before the payment due date. As represented by the block 270, the system is further configured to communicate a payment strategy recommendation to a user.

It will be understood that, as used herein, the phrase "transaction history" typically refers to any of the information associated with any one or more individual transactions in which an account has been involved, such as, for example, the description of the goods/services involved in the transaction, the transaction date, the posting date, the type of transaction (e.g., purchase, deposit, credit, debit, draw, etc.), the transaction amount, the names of the merchants or counterparties involved in the transaction, the locations of the merchants or counterparties involved in the transaction, and/or any other transaction data. It will be understood that the transaction history contemplated herein includes the information typically provided to the account holder in a periodic (e.g., monthly) account statement and/or via an online and/or mobile banking account. Transaction history information may also include any information typically included in an itemized, standard purchase receipt.

It will also be understood that, as used herein, the term "trend" typically refers to one or more earning, spending, credit, debit, and/or other behaviors, tendencies, and/or patterns evidenced by the transaction history(ies). For example, in some embodiments, the system is configured to determine that a paycheck is regularly deposited into the first account on the first and fifteenth of every month. Based at least partially on this trend, the system may be configured to determine: (1) two payments to make on the second account using funds from the first account; (2) the payment amount for each payment being exactly half of the paycheck amount; and (3) the triggering event for each payment being two days after each paycheck is deposited into the first account (i.e., the third and the seventeenth). As another example, in some embodiments, the system is configured to determine that the second account, which is a credit card account, is used to make a relatively large student loan payment on the last Monday of every month. Based at least partially on this trend, the system may be configured to determine a triggering event for each payment, such that all of the payments occur before the last Monday of every month in order to avoid a situation where the credit card account does not have sufficient credit to make the student loan payment.

It will be understood that the system may determine a trend based on one or more transaction dates, transaction amounts, transaction orders, transaction descriptions, and/or any other information found in the transaction history of the first account and/or the transaction history of the second account. It will also be understood that a trend may be determined from only one transaction date, amount, description, etc. found in a transaction history. For example, in some embodiments, the system having the process flow 200 is configured to determine a payment amount for a payment and a triggering event for that payment based solely on the amount and timing of a single payment made from the first account to the second account during a previous pay period. Further, it will be understood that the system having the process flow 200 may determine the minimum payment due and the payment due date for the second account based at least partially on the transaction history(ies) and/or in any way previously described and/or contemplated herein.

It will also be understood that, in some embodiments, the system is configured to determine a trend based at least partially on something other than the transaction history(ies)—hence, the inclusion of the phrase "at least partially" herein. Similarly, in some embodiments, the system is configured to determine a number of payments to make, a payment amount for each payment, and/or a triggering event for each payment based at least partially on something other than a trend. For example, in some embodiments, the system is configured to determine a payment strategy based at least partially on one or more rules that govern the payment strategy (discussed in more detail herein).

As another example, in some embodiments, the system having the process flow 200 is configured to prompt a user (e.g., the first and/or second account holder) to predict (e.g., input, determine, identify, define, etc.) a future earning and/or spending behavior, so that the system can determine one or more parameters of the payment strategy (e.g., the number of payments, the payment amount for each payment, the triggering event for each payment, etc.) based at least partially on that user-predicted future behavior. This is helpful where the first account and/or the second account are new or relatively new accounts and therefore have little, if any, transaction history associated with those accounts. This is also helpful to check whether an account holder's future behavior will conform to his or her past behavior. For example, in some embodiments, the system is configured to communicate a trend previously determined by the system to the account holder, so that the holder can confirm or deny that the trend will hold true in the future. In some embodiments, the system prompts the user to predict any foreseeable changes to the user's usual earning and/or spending behaviors (e.g., an expected raise, a new car payment, etc.), so that the system can determine a payment strategy that accounts for these changes. In other embodiments, the system is configured to present to the holder how (e.g., via graphs, charts, text, etc.) the one or more user-predicted future behaviors affects or will affect a previously-determined payment strategy, so that the holder can accept, modify, and/or reject the payment strategy in light of this information.

Regarding the step represented by the block 270, it will be understood that the system having the process flow 200 is configured to provide, present, and/or otherwise communicate a payment strategy recommendation to a user of the system (e.g., the first and/or second account holder), such that the user may accept, modify, or reject the payment strategy before the system (or some other system) executes the payment strategy. It will also be understood that the payment strategy recommendation may take any form, include any amount and/or type of information, may be communicated in any way, and may be provided to any system, device, etc. and/or to any user of any system, device, etc. It will also be understood that the payment strategy recommendation typically corresponds to the payment strategy determined by the system implementing the steps of the process flow 200. More specifically, in some embodiments, the payment strategy recommendation provides a summary of, and/or other information associated with, the total number of payments, the payment amount for each payment, the triggering event for each payment, and/or the like.

In some embodiments, the payment strategy recommendation includes functionality (e.g., one or more selectable buttons, fillable fields, etc.) configured to enable the user to accept, modify, and/or reject one or more portions of the payment strategy recommendation. For example, in some embodiments, the payment strategy recommendation includes functionality enabling the user to modify the recommendation's triggering event for each payment while accepting the recommendation's number of payments to make and the recommendation's payment amount for each payment.

In some embodiments, the payment strategy recommendation includes one or more other payment strategy recommendations in addition to, or instead of, the payment strategy determined by the steps of the process flow 200. These one or more other payment strategy recommendations may correspond to one or more payment strategies previously determined by the system having the process flow 200 (e.g., a payment strategy previously determined for and/or selected by the user, a payment strategy determined for another, similarly-situated user, etc.), one or more "default" payment strategies (e.g., make N payments during a single pay period on or before the payment due date, where each payment amount equals the minimum payment due divided by N), and/or the like. In some embodiments, the payment strategy recommendation includes several payment strategy recommendations, thereby increasing the number of payment strategies from which the user may select.

In some embodiments, the system having the process flow 200 is configured to provide the payment strategy recommendation to the first and second account holder via an online and/or mobile banking account. In such embodiments, the payment strategy recommendation may be presented to the account holder during an account setup process (e.g., when the account holder is adding the first and/or second account to the online and/or mobile banking account, when the account holder is configuring one or more settings associated with the first and/or second account via the online and/or mobile banking account, etc.), during an account payment process (e.g., when the account holder is scheduling a payment involving the first and/or second account via the online and/or mobile banking account, etc.), and/or at some other time the account holder accesses the first and/or second account via the online and/or mobile banking account. Also, in some embodiments, the payment strategy recommendation may include or take the form of an e-mail message, instant message, pop-up, pop-under, video, mobile alert, and/or some other notification accessible via an online and/or mobile banking account.

In other embodiments, the system having the process flow 200 is configured to provide the payment strategy recommendation to a financial institution employee (e.g., customer service representative, bank teller, etc.), so that the employee may then communicate the payment strategy recommendation to the account holder via, for example, in-person communication, telephone call, e-mail message, mobile alert, and/or some via some other kind of notification and/or communication. For example, in some embodiments, the system having the process flow 200 is configured to provide the payment strategy recommendation to a customer service representative at that representative's computer, terminal, etc. when that representative accesses the account holder's profile during a customer service call with the account holder.

Referring now to FIG. 3, a general process flow 300 of a system for determining and executing a payment strategy based at least partially on one or more user selections is provided, in accordance with an embodiment of the present invention. As represented by the block 310, the system having the process flow 300 is configured to prompt a user to select a first account and a second account for linking As represented by the block 320, the system is configured to determine that the second account includes a payment due date and a minimum payment due. As represented by the block 330, the system is also configured to prompt the user to select the number of payments to make on the second account using at least some funds from the first account. As represented by the block 340, the system is further configured to prompt the user to select a payment amount for each payment, such that the total payment amount for all of the payments is sufficient to at least offset the minimum payment due. As represented by the block 350, the system is configured to prompt the user to select a triggering event for each payment, such that each of the payments occurs on or before the payment due date. As represented by the block 360, the system is configured to receive the user's selections. As represented by the block 370, the system is configured to link the first account to the second account, and, as represented by the block 380, the system is configured to execute a payment strategy based at least partially on the user's selections.

Thus, it will be understood that the system having the process flow 300 is configured to determine the number of payments to make, the payment amount for each payment, and the triggering event for each payment, where each determination is based at least partially on a user selection. As a specific example, where the minimum payment due is $850 and the payment due date is December 31st (and the pay period begins on December 1st), the user may select: (1) a savings account to link to a credit card account; (2) five payments to make on the credit card account using at least some funds from the savings account; (3) select $350 for the first payment amount and select $125 as the payment amount for the four subsequent payments; (4) select a deposit into the savings account of over $400 as the triggering event for the first payment and select the end of day December 12, 18, 24, and 30, respectively, as the triggering events for the four subsequent payments.

It will also be understood that, as used in this context, "the user" may include the holder of the first and/or second accounts, a financial institution employee (e.g., customer service representative, bank teller, etc.), and/or some other user of the system having the process flow 300. It will be understood that, in some embodiments, the system having the process flow 300 is configured to communicate with a user via an online and/or mobile banking account. In other embodiments, the system having the process flow 300 is embodied as an online and/or mobile banking tool in an online and/or mobile banking account. In such embodiments, the tool prompts the account holder, the account holder uses the tool to make each of the selections described in connection with the blocks 310-350, and the tool receives those selections, all via the online and/or mobile banking account.

Regarding the step represented by the block 370, it will be understood that the first account may be linked to the second account in any way. It will also be understood that, by "linked," it is meant that the first account is electronically and/or communicably connected to the second account, such that, for example, at least some funds in the first account may be used to make a payment on the second account. It will be further understood that, in some embodiments, the system having the process flow 300 is configured to link two or more accounts to the second account, such that at least some funds from the two or more accounts may be used to make two or more payments on the second account.

Regarding the step represented by the block 380, it will be understood that the payment strategy is based at least partially on one or more of the steps described in connection with the blocks 310-370. It will also be understood that the system having the process flow 300 may be configured to execute the payment strategy in any way. For example, in some embodiments, the system is configured to schedule one or more payments in accordance with the payment strategy. As another example, in some embodiments, the system is configured to use at least some funds from the first account to make two or more payments on the second account (e.g., via electronic wire) in accordance with the payment strategy. As still another example, in some embodiments, the system is configured to configure another system (e.g., an account management system) to execute the payment strategy.

It will be understood that the content, order, and/or number of the steps of the process flow 100, 200, and/or 300, as well as any other process flow described and/or contemplated herein, are exemplary and may vary. For example, in some embodiments, the implementation of one or more of the steps of the process flow 100 (and/or 200 and/or 300) may be automatically triggered by the implementation of one or more other steps of the process flow 100 (and/or 200 and/or 300). As another example, in some embodiments, the system having the process flow 100 is configured to determine a triggering event for each payment before determining a payment amount for each payment. As another example, in some embodiments, the system having the process flow 200 is configured to omit the step of recommending the payment strategy to the user. As still another example, in some embodiments, the system having the process flow 200 is configured to execute a payment strategy based at least partially on the payment strategy recommendation (e.g., when/if a user accepts the payment strategy recommendation). As a further example, in some embodiments, the system having the process flow 300 is configured to prompt the user to select the number of payments, but the system is configured to automatically determine the payment amount for each payment and/or the triggering event for each payment.

It will also be understood that, as mentioned previously, one or more of the steps, or combinations of steps, of the process flow 200 and/or 300 may be implemented by the system having the process flow 100, and/or vice versa. For example, in some embodiments, the system having the process flow 100 is also configured to communicate a payment strategy recommendation to a user based at least partially on one or more of the steps described in connection with the blocks 120-150. As another example, in some embodiments, the system having the process flow 200 is configured to link the first account to the second account and execute a payment strategy based at least partially on one or more of the steps described in connection with the blocks 220-260, instead of, or in addition to, communicating the payment strategy recommendation to the user. As still another example, in some embodiments, the system having the process flow 300 is configured to communicate a payment strategy recommendation to the user that summarizes all of the user's selections and/or prompts the user to confirm his or her selections, all before executing the payment strategy.

It will also be understood that the general process flows 100, 200, and/or 300 may also include additional or alternative steps not previously described in detail herein. For example, in some embodiments, a system having the process flow 100, 200, and/or 300 is configured to communicate (e.g., transmit, receive, etc.) one or more notifications associated with one or more of the steps of the process flow 100, 200, and/or 300. Specifically, in some embodiments, the system is configured to communicate an e-mail message to a user that confirms that two accounts have been linked and/or that a payment strategy has been determined. In other embodiments, as another example, the system is configured to communicate a digital receipt having information associated with a made or scheduled payment. In some embodiments, the system is configured to communicate these one or more notifications to the first and/or second account holder at that holder's online and/or mobile banking account.

As another example, in some embodiments, the system having the process flow 100, 200, and/or 300 is configured to determine (and/or facilitate a user of the system to select) one or more rules for governing the payment strategy. Some of the embodiments previously described herein already include one or more rules for governing the payment strategy, such as, for example, the total payment amount for all of the payments must be sufficient to at least offset the minimum payment due, each of the payments must occur on or before the payment due date during a single pay period, etc. However, additional or alternative rules may govern a payment strategy in other embodiments. For example, in some embodiments, a system having the process flow 100, 200, and/or 300 is configured to determine, recommend, and/or execute a payment strategy that ensures that funds from the first account are not used to make a payment on the second account if the account balance for the first account falls below a predetermined (e.g., system-determined, user-selected, etc.) threshold (e.g., amount, percentage of an amount, etc.). In such embodiments, as another example of a rule, the system may be configured to use funds from a third account (assuming that the third account has sufficient funds) to make the payment on the second account instead.

As another example of a rule, in some embodiments, a system having the process flow 100, 200, and/or 300 is configured to determine, recommend, and/or execute a payment strategy that ensures that a payment amount never exceeds a predetermined (e.g., system-determined, user-selected, etc.) threshold (e.g., amount, percentage of an amount, etc.). As still another example of a rule, in some embodiments where the second account is a credit card account, a system having the process flow 100, 200, and/or 300 may be configured to determine, recommend, and/or execute a payment strategy that divides the minimum payment due into two or more payments in order to reduce the total amount of interest paid on the credit card account by a predetermined (e.g., system-determined, user-selected) threshold (e.g., amount, percentage of an amount, etc.) over the life of the credit card account balance, when that payment strategy is compared to a payment strategy of making a single payment equal to the minimum payment due on the payment due date for each pay period over the life of the credit card account balance. As a further example of a rule, in some embodiments where the second account is a credit card account, a system having the process flow 100, 200, and/or 300 is configured to refrain from making a payment towards any transaction in which the credit card was not physically presented, i.e., "card not present" or "CNP" transactions.

As still another example of a rule, in some embodiments, a system having the process flow 100, 200, and/or 300 is configured to determine, recommend, and/or execute a payment strategy based at least partially on a predetermined geographic area (e.g., make a payment in an amount sufficient to offset all of the transactions that occurred within ten miles of my home, do not make any payment towards any transaction occurring outside of the United States, etc.). As another example, in some embodiments, the system is configured to determine, recommend, and/or execute a payment strategy based at least partially on a particular merchant or counterparty (e.g., make a payment equal to one-half of the total amount of all transactions with a specific store) and/or a particular kind of good and/or service (e.g., do not pay off any transaction associated with a predetermined merchant category code, etc.). It will be understood that any one or more of the embodiments described and/or contemplated herein may be configured to determine, recommend, and/or execute a payment strategy in accordance with any one or more of the rules described and/or contemplated herein.

As another example of an additional or alternative step, in some embodiments, the system having the process flow 100, 200, and/or 300 is additionally or alternatively configured to determine, and/or recommend to a user, one or more accounts to involve in the payment strategy. For example, in some embodiments, the system is configured to access a bank customer's online and/or mobile banking account to determine the number and types of accounts held by the customer, how frequently those accounts are used (e.g., via transaction histories of those accounts), how well those accounts are funded, etc., and then based on that information, recommend to the customer which accounts they should select for involvement in the payment strategy. As another example, in some embodiments, the system is configured to automatically: (1) determine two or more accounts (e.g., the first account and the second account) for involvement in a payment strategy; (2) link those two or more accounts; and (3) execute the payment strategy involving those two or more accounts.

As still another example of an additional or alternative step, in some embodiments, the system having the process flow 100, 200, and/or 300 is additionally or alternatively configured to attribute rewards to the first account and/or the second account. As used herein, the term "rewards" typically refers to one or more benefits associated with an account, such as, for example, rewards points, rewards multipliers (2.times., 3.times., etc.), airline miles, cash back, a one-time statement credit, a lower interest rate, a refund, an interest payment rebate, and/or the like. It will be understood that the system can be configured to attribute rewards to the first account and/or the second account for any reason. In some embodiments, the system is configured to attribute rewards based at least partially on using and/or having the first account and/or the second account. For example, in some embodiments, the second account is a rewards credit card account that is structured to accumulate rewards when the rewards credit card account is used to make purchases. In other words, in such embodiments, the rewards are based at least partially on the account incurring one or more liabilities.

However, in other embodiments, the system is alternatively or additionally configured to attribute rewards to the first account and/or the second account based at least partially on linking the first account to the second account. As another example, in some embodiments, the system is configured to attribute rewards to the first account and/or the second account for enrolling the first account, the second account, and/or the account holder in a financial institution program and/or service for determining, recommending, and/or executing a payment strategy. In some embodiments, the system is configured to attribute rewards to the first account and/or the second account based at least partially on executing the payment strategy. For example, in some embodiments, the system is configured to attribute rewards to the first account every time funds from the first account are used to make a payment on the second account. In still other embodiments, the system is configured to attribute rewards to a third account as a result of linking the first account to the second account and/or making one or more payments from the first account to the second account. For example, in some embodiments, every time funds are transferred from a bank customer's checking account to the bank customer's LOC account, the system is configured to deposit cash (e.g., matching funds) into the bank customer's savings account.

As a further example of an additional or alternative step, in some embodiments, the system having the process flow 100, 200, and/or 300 is additionally or alternatively configured to monitor (and/or facilitate a user to monitor) the financial health of the first account, the second account, and/or the account holder. For example, a bank may maintain the system, and a bank customer may be the holder of the first account and the second account. In such a case, the system could be configured to automatically notify the bank and/or the bank customer when the customer's first account is approaching a predetermined threshold after making a payment on the second account, when the customer modifies, queues, or stops the execution of the payment strategy, and/or when some other indicator of financial distress occurs.

It will also be understood that, in addition to optimizing payments within a single payment strategy, the system having the process flow 100, 200, and/or 300 may also be configured to optimize payments across multiple payment strategies. For example, the system may be configured to determine a first payment strategy for using a checking account to make two or more payments on a credit card account during a single pay period. In addition, the system may be configured to determine a second payment strategy for using the same checking account to make two or more payments on a mortgage account during the same, single pay period. In such a case, the system can be configured to determine, recommend, and/or execute each of the parameters (e.g., number of payments, payment amounts, triggering events for making payments, rules, etc.) of the first and second payment strategies, such that first payment strategy accommodates (e.g., is in accordance with, does not interfere with, etc.) the second payment strategy, and/or vice versa. For example, if the first payment strategy requires using funds from the checking account to make a large payment on the credit card account on a certain day during the pay period, the second payment strategy can be determined so that it does not interfere with making that large payment. As another example, the system may be configured to sequence payments from the first and second payment strategies and/or prioritize one or more payments over others. For instance, using the example above, the system may be configured to determine, recommend, and/or execute the first and second payment strategies, such that one or more payments are made on the mortgage account before making one or more payments on the credit card account. Of course, it will be understood that the system having the process flow 100, 200, and/or 300 can be configured to optimize payments within a single payment strategy and/or optimize payments across multiples payment strategies based at least partially on one or more trends, rules, user-predicted future behaviors, user selections, system determinations, and/or the like.

Referring now to FIG. 4, a system 400 for determining, recommending, and/or executing a payment strategy is provided, in accordance with an embodiment of the present invention. As illustrated, the system 400 includes a network 410, a user interface system 420, and an account management system 430. FIG. 4 also illustrates a credit account 431 (e.g., a credit card account, a HELOC account, student loan account, store credit account, etc.) and a deposit account 433 (e.g., a checking account, a savings accounts, money market account, investment account, etc.), both of which are operatively connected (e.g., linked) to the account management system 430, as well as to each other. Also shown in FIG. 4 is a bank customer 415 that has access to the user interface system 420. In this embodiment, the user interface system 420 is maintained by the bank customer 415, and the account management system 430, along with the credit account 431 and the deposit account 433, are maintained by the bank (not shown) for the benefit of the bank customer 415.

As shown in FIG. 4, the user interface system 420 and the account management system 430 are each operatively and selectively connected to the network 410, which may include one or more separate networks. In addition, the network 410 may include a local area network (LAN), a wide area network (WAN), and/or a global area network (GAN), such as the Internet. It will also be understood that the network 410 may be secure and/or unsecure and may also include wireless and/or wireline technology.

The user interface system 420 may include any computerized apparatus that can be configured to perform any one or more of the functions of the user interface system 420 described and/or contemplated herein. In some embodiments, for example, the user interface system 420 may include a personal computer system, a mobile phone, a personal digital assistant, a public kiosk, a network device, and/or the like. As illustrated in FIG. 3, in accordance with some embodiments of the present invention, the user interface system 420 includes a communication interface 422, a processor 424, a memory 426 having a browser application 427 stored therein, and a user interface 429. In such embodiments, the communication interface 422 is operatively and selectively connected to the processor 424, which is operatively and selectively connected to the user interface 429 and the memory 426.

Each communication interface described herein, including the communication interface 422, generally includes hardware, and, in some instances, software, that enables a portion of the system 400, such as the user interface system 420, to transport, send, receive, and/or otherwise communicate information to and/or from the communication interface of one or more other portions of the system 400. For example, the communication interface 422 of the user interface system 420 may include a modem, server, electrical connection, and/or other electronic device that operatively connects the user interface system 420 to another electronic device, such as the electronic devices that make up the account management system 430.

Each processor described herein, including the processor 424, generally includes circuitry for implementing the audio, visual, and/or logic functions of that portion of the system 400. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the browser application 427 of the memory 426 of the user interface system 420.

Each memory device described herein, including the memory 426 for storing the browser application 427 and other data, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 4, the memory 426 includes the browser application 427. In some embodiments, the browser application 427 includes a web browser and/or some other application for communicating with, navigating, controlling, configuring, and/or using the account management system 430 and/or other portions of the system 400. Specifically, in some embodiments, the bank customer 415 uses the browser application 427 for any purpose relating to determining, recommending, and/or executing a payment strategy. For example, in some embodiments, the bank customer 415 uses the browser application 427 to receive and/or select one or more payment strategy recommendations, to make one or more selections relating to a payment strategy (e.g., selecting a number of payments, a payment amount for each payments, a triggering event for each payment, etc.), and/or to perform any other function relating to determining, recommending, and/or executing a payment strategy.

As another example, in some embodiments, the bank customer 415 uses the browser application to determine a rule for governing a payment strategy, and/or to trigger, modify, queue, and/or stop the execution of a payment strategy. It will be understood that, in some embodiments, the bank customer 415 uses the browser application 427 to access an online and/or mobile banking account for managing the credit account 431, managing the deposit account 433, and/or for any purpose relating to determining a payment strategy. In some embodiments, the browser application 427 includes computer-executable program code portions for instructing the processor 424 to perform one or more of the functions of the browser application 427 described and/or contemplated herein. In some embodiments, the browser application 427 may include and/or use one or more network and/or system communication protocols.

Also shown in FIG. 4 is the user interface 429. In some embodiments, the user interface 429 includes one or more user output devices, such as a display and/or speaker, for presenting information to the bank customer 415 and/or some other user. In some embodiments, the user interface 429 includes one or more user input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the bank customer 415 and/or some other user. In some embodiments, the user interface 429 includes the input and display devices of a personal computer, such as a keyboard and monitor, that are operable to receive and display information associated with determining a payment strategy.

FIG. 4 also illustrates an account management system 430, in accordance with an embodiment of the present invention. The account management system 430 may include any computerized apparatus that can be configured to perform any one or more of the functions of the account management system 430 described and/or contemplated herein. In accordance with some embodiments, for example, the account management system 430 may include a computer network, an engine, a platform, a server, a database system, a front end system, a back end system, a personal computer system, and/or the like. In some embodiments, such as the one illustrated in FIG. 4, the account management system 430 includes a communication interface 432, a processor 434, and a memory 436, which includes an account application 437 and an account datastore 438 stored therein. As shown, the communication interface 432 is operatively and selectively connected to the processor 434, which is operatively and selectively connected to the memory 436.

It will be understood that, in some embodiments, the account application 437 is operable to implement any one or more embodiments described and/or contemplated herein that relate to determining, recommending, and/or executing a payment strategy. For example, in some embodiments, the account application 437 is configured to determine a payment strategy for using funds from the deposit account 433 to make two or more payments on the credit account 431 during a single pay period. In some embodiments, the account application 437 is configured to make this determination based at least partially on the transaction history of the deposit account 433 and/or the transaction history of the credit account 431. As another example, in some embodiments, the account application 437 is configured to prompt a user (e.g., the bank customer 415) to make one or more user selections relating to determining a payment strategy. As still another example, in some embodiments, the account application 437 is configured to prompt a user (e.g, the bank customer 415) to determine one or more rules for governing a payment strategy. As still another example, in some embodiments, the account application 437 is configured to communicate a payment strategy recommendation to a user (e.g., the bank customer 415, a bank customer service representative, etc.). As a further example, in some embodiments, the account application 437 is configured to link the deposit account 433 to the credit account 431 and/or execute a payment strategy involving the deposit account 433 and the credit account 431. As a further example, in some embodiments, the account application 437 is configured to provide an online and/or mobile banking tool configured to implement the general process flow 100, 200, 300, and/or any other embodiments described and/or contemplated herein.

It will also be understood that, in some embodiments, the account application 437 is additionally configured to provide other kinds of financial services. For example, in some embodiments, the account application 437 is configured to provide online and/or mobile banking services to the bank customer 415 at the user interface system 420. As another example, in some embodiments, the account application 437 is configured to perform one or more functions of a financial transaction processing system, including, for example, processing and/or posting one or more financial transaction involving the credit account 431 and/or the deposit account 433.

It will also be understood that, in some embodiments, the account application 437 is configured to communicate with the account datastore 438, the user interface system 420, and/or any one or more other portions of the system 400. For example, in some embodiments, the account application 437 is configured to create and/or send one or more notifications to the bank customer 415 at the user interface system 420 that, for example, a payment has been made on the credit account 431 using at least some funds from the deposit account 433, that the bank customer 415 has selected and/or accepted a payment strategy recommendation, and/or that the execution of a payment strategy has been triggered, modified, queued, and/or stopped. It will be further understood that, in some embodiments, the account application 437 includes computer-executable program code portions for instructing the processor 434 to perform any one or more of the functions of the account application 437 described and/or contemplated herein. In some embodiments, the account application 437 may include and/or use one or more network and/or system communication protocols.

In addition to the account application 437, the memory 436 also includes the account datastore 438. In some embodiments, the account datastore 438 includes information associated with one or more financial accounts (e.g., the credit account 431, the deposit account 433, one or more accounts maintained by one or more other financial institutions (not shown), etc.), including, for example, account names, persons and/or entities associated with the financial accounts, addresses associated with the financial accounts, transaction history(ies) of the financial accounts, whether one or more financial accounts are linked to one or more other financial accounts, and/or any other type and/or amount of information. In some embodiments, the account datastore 438 may also store any information relating to determining, recommending, and/or executing a payment strategy. For example, in some embodiments, the account datastore 438 stores information associated with one or more payment strategies, rules for governing those payment strategies, user selections relating to those payment strategies, and/or the like. In some embodiments, the account datastore 438 additionally or alternatively stores information associated with online and/or mobile banking accounts and/or services.

It will be understood that the account datastore 438 may include any one or more storage devices, including, but not limited to, datastores, databases, and/or any of the other storage devices typically associated with a computer system. It will also be understood that the account datastore 438 may store information in any known way, such as, for example, by using one or more computer codes and/or languages, alphanumeric character strings, data sets, figures, tables, charts, links, documents, and/or the like. Further, in some embodiments, the account datastore 438 may include information associated with one or more applications, such as, for example, the account application 437. It will also be understood that, in some embodiments, the account datastore 438 provides a substantially real-time representation of the information stored therein, so that, for example, when the processor 434 accesses the account datastore 438, the information stored therein is current or substantially current.

It will be understood that some or all of the portions of the system 400 may be combined into a single portion. For example, in some embodiments, the user interface system 420 and the account management system 430 are combined into a single user interface and account management system configured to perform all of the same functions of those separate portions as described and/or contemplated herein. Likewise, in some embodiments, some or all of the portions of the system 400 may be separated into two or more distinct portions. For example, in some embodiments, the account management system 430 may be separated into a first system configured to communicate a payment strategy recommendation and a second system configured to execute a payment strategy.

In addition, the various portions of the system 400 may be maintained for by the same or separate parties. For example, as previously mentioned, a single financial institution may maintain the credit account 431 and the deposit account 433, as well as the account management system 430. However, in other embodiments, the accounts and/or the account management system 430 may each be maintained by separate entities.

It will also be understood that the system 400 may include and/or be configured to implement any one or more portions, and/or any one or more combinations of portions, of any embodiment of the present invention described and/or contemplated herein. For example, in some embodiments, the system 400 is configured to implement any one or more portions of the embodiments of the process flow 100 described and/or contemplated herein in connection with FIG. 1, any one or more portions of the embodiments of the process flow 200 described and/or contemplated herein in connection with FIG. 2, any one or more portions of the embodiments of the process flow 300 described and/or contemplated herein in connection with FIG. 3, any one or more portions of the embodiments described and/or contemplated herein in connection with FIG. 5, and/or any one or more portions of any of the other embodiments described and/or contemplated herein. As a specific example, in some embodiments, the account application 437 is configured to cause the processor 434 to: (1) determine that the credit account 431 includes a payment due date and a minimum payment due, as represented by the block 120 in FIG. 1; (2) determine a number of payments to make on the credit account 431 using at least some funds from the deposit account 433, as represented by the block 130; (3) determine a payment amount for each payment, such that the total payment amount for all of the payments is sufficient to at least offset the minimum payment due, as represented by the block 140; and (4) determine a triggering event for each payment, such that each of the payments is made on or before the payment due date, as represented by the block 150.

Referring now to FIG. 5, a mixed block and flow diagram of a system 500 for determining, recommending, and executing a payment strategy, in accordance with a more-detailed embodiment of the present invention. As shown, the system 500 includes a user interface system 502 and an account management system 504. It will be understood that the user interface system 502 is operatively and selectively connected to the account management system 504 via a network (not shown). It will also be understood that the user interface system 502 is accessible to a bank customer (not shown), and that the bank customer has a checking account and a credit card account that are maintained by the bank. It will further be understood that the bank provides the bank customer with access to an online banking account (not shown) for managing and/or otherwise accessing the customer's bank and/or non-bank accounts, and that the customer uses the online banking account, via the user interface system 502, to perform the steps represented by the blocks 505, 520, and 550.

As represented by the block 505, the customer uses the user interface system 502 to access the online banking account in order to select the checking account and the credit card account for linking After receiving the bank customer's selection, the account management system 504 is configured to determine that the credit card account has a minimum payment due of $400 and a payment due date of May 25th, as represented by the block 510. (For purposes of this example embodiment, it will be understood that the credit card account balance is $2,400 and that all of the steps illustrated in FIG. 5 take place on April 25th.) Then, as represented by the block 515, the account management system 504 is configured to prompt the bank customer to select a number of payments to make on the credit card using at least some funds from the checking account. In response, the bank customer uses the online banking account, via the user interface system 502, to select three payments to make on the credit card account using at least some funds from the checking account, as represented by the block 520.

After receiving the bank customer's selection, the account management system 504 is configured to collect information associated with the transaction history of the checking account, as represented by the block 525. Then, as represented by the block 530, the account management system 504 is configured to determine a first trend based at least partially on the transaction history of the checking account, namely, that a $1200 paycheck has been deposited into the checking account on the 1st and 15th of every month for the past year. As represented by the block 535, the account management system 504 is also configured to determine a second trend based at least partially on the transaction history of the checking account, namely that the checking account has been used to make a $900 bill payment (e.g., mortgage, student loan, cable, water, utility, etc.) on the 4th and 20th of every month for the past year. (For purposes of this example embodiment, it will be understood that the two monthly $900 bill payments are the only outflows for the checking account each month.)

Based at least partially on these trends, the account management system 504 is configured to determine a payment strategy for the bank customer, as represented by the block 540. Although not shown in FIG. 5, it will be understood that the account management system 504 is configured to determine, recommend, and execute a payment strategy that conforms to the following three rules: (1) the total payment amount for all of the payments from the checking account to the credit card account must be sufficient to at least offset the minimum payment due of $400; (2) each of the payments must be made on or before the payment due date of May 25th; and (3) the payment strategy must not cause the checking account balance to ever fall below zero. It will be also be understood that the account management system 504 is configured, in this example embodiment, to assume that the April 25th checking account balance is greater than or equal to $0, as well as assume that the paycheck and bill payment trends determined by the account management system 504 will hold true for the month of May.

Thus, in accordance with these rules and the bank customer's selections, and based at least partially on the first and second trends, the account management system 504 is configured to determine a payment strategy that, in this example embodiment, involves: (1) three payments to make from the checking account to the credit card account before the payment due date of May 25th; (2) the first payment being in the amount of $133 and scheduled for May 3rd; (3) the second payment being in the amount of $133 and scheduled for May 17th; and (4) the third payment being in the amount of $134 and scheduled for May 24th. It will be understood that this payment strategy conforms to the bank customer's selections and will conform to each of the three rules so long as the first and second trends previously determined by the account management system 504 hold true for the month of May and thereafter. It will also be understood that, by dividing up the minimum payment due into three separate payments made before the payment due date, this payment strategy will reduce the total amount of interest paid on the credit card account over the life of the credit card account balance, as compared to a payment strategy of making a single payment equal to the minimum payment due on the payment due date for each pay period over the life of the credit card account balance.

After determining the payment strategy, the account management system 504 is configured to communicate a payment strategy recommendation to the bank customer and prompt the bank customer to accept the recommendation, as represented by the block 545. It will be understood that, in this example embodiment, the payment strategy recommendation provides information about the previously-described payment strategy determined by the account management system 504, including, for example, the number of payments, the payment amounts, the payment dates, the total interest that will be saved during the pay period and/or over the life of the credit card account balance, etc. It will also be understood that, in this example embodiment, the payment strategy recommendation includes functionality (e.g., one or more selectable buttons, fillable fields, etc.) configured to enable the bank customer, via the online banking account, to accept, reject, or modify the payment strategy provided in the payment strategy recommendation. Referring again to FIG. 5, in this example embodiment, after receiving the payment strategy recommendation, the bank customer accepts the payment strategy recommendation via the banking account, as represented by the block 550. Thereafter, as represented by the block 555, the account management system 504 is configured to link the checking account to the credit card account and execute the payment strategy in accordance with the accepted payment strategy recommendation.

Of course, it will be understood that the embodiment described above in connection with FIG. 5 is exemplary and may vary in any way previously described and/or contemplated herein. It will also be understood that the system 500 may, where possible, include and/or implement any other embodiment of the present invention as described and/or contemplated herein. Likewise, any other embodiment of the present invention described and/or contemplated herein may, where possible, be configured to implement one or more of the steps 505-555, as described in connection with FIG. 5.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for determining a payment strategy for using at least some funds from a first account to make two or more payments on a second account during a single pay period, the method comprising:

accessing a memory via a computing device processor, where said memory comprises computer instructions specifically configured such that when operated by said computing device processor causes said computing device processor to:

receive information associated with a transaction history of a first account;

determine, via a computing device processor, a trend in a balance of the first account over time based at least partially on the transaction history of the first account;

determine that a second account comprises a payment due date and a minimum payment due for a single pay period;

determine two or more payments based at least partially on the trend in the balance of the first account, which when added together are at least equal to the minimum payment due to the second account, wherein the determining two or more payments comprises:

determining a payment amount for each payment, such that a total payment amount for all of the payments is at least equal to the minimum payment due for the single pay period for the second account;

determining a payment date for each payment based at least partially on the trend in the balance, such that each of the payments is made on or before the payment due date; and communicate a payment strategy recommendation to a user, wherein the payment strategy recommendation provides at least one of a recommended number of payments, the payment amount for each payment, and the payment date for each payment.

2. The method of claim 1, wherein at least one of determining the number of payments, determining the payment amount for each payment, or determining the payment date for each payment is based at least partially on a user selection.

3. The method of claim 1, wherein at least one of determining the number of payments, determining the payment amount for each payment, or determining the payment date for each payment is based at least partially on a user-predicted future behavior.

4. The method of claim 1, wherein said computing device processor is further configured to receive input from the user, wherein the input enables the user to accept, modify, or reject the payment strategy recommendation.

5. The method of claim 1, wherein said computing device processor is further configured to recommend to the user the first account and the second account for involvement in the payment strategy.

6. The method of claim 1, wherein said computing device processor is further configured to prompt the user to select the first account and the second account for involvement in the payment strategy.

7. The method of claim 1, wherein said computing device processor is further configured to:

link the first account to the second account; and execute the payment strategy based at least partially on the number of payments, the payment amount for each payment, and the payment date for each payment.

8. The method of claim 7, wherein said computing device processor is further configured to attribute rewards to the first account or the second account based at least partially on executing the payment strategy.

9. The method of claim 1, wherein determining the number of payments further comprises determining N payments, and wherein determining the payment amount for each payment further comprises determining a payment amount for each payment that is equal to the minimum payment due divided by N.

10. The method of claim 1, wherein the first account comprises two or more accounts.

11. The method of claim 1, wherein the first account comprises a deposit account and the second account comprises a credit account.

12. The method of claim 1, wherein the first account is maintained by a first financial institution and the second account is maintained by a second financial institution.

13. A system for using at least some funds from a first account to make two or more payments on a second account during a single pay period, the system comprising:

a memory device;

a communication device; and a processor coupled to the memory device, wherein the processor is configured to:

receive information associated with a transaction history of a first account;

determine a trend in a balance of the first account over time based at least partially on the transaction history of the first account;

determine that the second account comprises a payment due date and a minimum payment due for a single pay period;

determine two or more payments based at least partially on the trend in the balance of the first account, which when added together are at least equal to the minimum payment due to the second account, wherein the determining two or more payments comprises:

determining a payment amount for each payment, such that a total payment amount for all of the payments is at least equal to the minimum payment due for the single pay period of the second account;

determining a payment date for each payment based at least partially on the trend in the balance, such that each of the payments is made on or before the payment due date; and communicate a payment strategy recommendation to a user, wherein the payment strategy recommendation provides at least one of a recommended number of payments, the payment amount for each payment, and the payment date for each payment.

14. The system of claim 13, wherein the processor is configured to determine at least one of the number of payments, the payment amount for each payment, or the payment date for each payment based at least partially on a user selection.

15. The system of claim 13, wherein the processor is configured to determine at least one of the number of payments, the payment amount for each payment, or the payment date for each payment is based at least partially on a user-predicted future behavior.

16. The system of claim 13, wherein the processor is further configured to receive input from the user, wherein the input enables the user to accept, modify, or reject the payment strategy recommendation.

17. The system of claim 13, wherein the processor is further configured to recommend to the user the first account and the second account for involvement in the payment strategy.

18. The system of claim 13, wherein the processor is further configured to prompt a user to select the first account and the second account for involvement in the payment strategy.

19. The system of claim 13, wherein the processor is further configured to: link the first account to the second account; and execute the payment strategy based at least partially on the number of payments, the payment amount for each payment, and the payment date for each payment.

20. The system of claim 19, wherein the processor is further configured to attribute rewards to the first account or the second account based at least partially on executing the payment strategy.

21. The system of claim 13, wherein the number of payments comprises N payments, and wherein the payment amount for each payment is equal to the minimum payment due divided by N.

22. A computer program product for using at least some funds from a first account to make two or more payments on a second account during a single pay period, the computer program product comprising a computer-readable medium having computer-executable computer program code portions stored therein, wherein the computer-executable program code portions comprise:
 a program code portion configured to receive information associated with a transaction history of a first account;
 a program code portion configured to determine a trend in a balance of the first account over time based at least partially on the transaction history of the first account;
 a program code portion configured to determine that the second account comprises a payment due date and a minimum payment due for a single pay period;
 a program code portion configured to determine two or more payments based at least partially on the trend in the balance of the first account, which when added together are at least equal to the minimum payment due to the second account, wherein the determining two or more payments comprises:
  determining a payment amount for each payment, such that a total payment amount for all of the payments is at least equal to the minimum payment due for the single pay period for the second account;
  determining a payment date for each payment based at least partially on the trend in the balance, such that each of the payments is made on or before the payment due date; and
 a program code portion configured to communicate a payment strategy recommendation to a user, wherein the payment strategy recommendation provides at least one of a recommended number of payments, the payment amount for each payment, and the payment date for each payment.

23. The computer program product of claim 22, wherein at least one of the number of payments, the payment amount for each payment, or the payment date for each payment is based at least partially on a user selection.

24. The computer program product of claim 22, wherein at least one of the number of payments, the payment amount for each payment, or the payment date for each payment is based at least partially on a user-predicted future behavior.

25. The computer program product of claim 22, further comprising: a program code portion configured to link the first account to the second account; and a program code portion configured to execute the payment strategy based at least partially on the number of payments, the payment amount for each payment, and the payment date for each payment.

* * * * *